(12) United States Patent  
Beigne et al.

(10) Patent No.: US 7,940,666 B2  
(45) Date of Patent: May 10, 2011

(54) COMMUNICATION NODE ARCHITECTURE IN A GLOBALLY ASYNCHRONOUS NETWORK ON CHIP SYSTEM

(75) Inventors: Edith Beigne, Thorenas (FR); Pascal Vivet, Paul de Varces (FR); Marc Renaudin, Biviers (FR); Jérôme Quartana, Grenoble (FR)

(73) Assignees: Commissariat a l'Energie Atomique, Paris (FR); Centre National de la Recherche Scientifique, Paris (FR); Institut National Polytechnique de Grenoble, Grenoble (FR)

( * ) Notice: Subject to any disclaimer, the term of this patent is extended or adjusted under 35 U.S.C. 154(b) by 834 days.

(21) Appl. No.: 11/372,296

(22) Filed: Mar. 8, 2006

(65) Prior Publication Data

US 2006/0203825 A1    Sep. 14, 2006

(30) Foreign Application Priority Data

Mar. 8, 2005    (FR) ..................................... 05 50611

(51) Int. Cl.  
    *G01R 31/08*    (2006.01)
(52) U.S. Cl. ...................................................... 370/236
(58) Field of Classification Search .................. 370/236, 370/229, 235; 216/221, 222; 379/15.02, 379/15.01, 13, 9, 1.01, 14.01, 14  
See application file for complete search history.

(56) References Cited

U.S. PATENT DOCUMENTS

| | | | |
|---|---|---|---|
| 5,812,534 A * | 9/1998 | Davis et al. ................... | 370/260 |
| 6,597,920 B2 * | 7/2003 | Yegani et al. ................. | 455/512 |
| 6,859,454 B1 * | 2/2005 | Bowes .......................... | 370/366 |
| 6,917,589 B2 * | 7/2005 | Berenbaum ................... | 370/232 |
| 2004/0017820 A1 * | 1/2004 | Garinger et al. .............. | 370/419 |
| 2004/0081193 A1 * | 4/2004 | Forest et al. .................. | 370/458 |
| 2004/0090964 A1 * | 5/2004 | Reed et al. ................. | 370/395.4 |
| 2004/0179535 A1 * | 9/2004 | Bertagna .................. | 370/395.21 |
| 2006/0190852 A1 * | 8/2006 | Sotiriou ............................ | 716/3 |
| 2006/0227811 A1 * | 10/2006 | Hussain et al. .............. | 370/503 |
| 2007/0277053 A1 * | 11/2007 | Timmermans ................ | 713/401 |
| 2008/0123541 A1 * | 5/2008 | Dielissen et al. ............ | 370/252 |
| 2008/0137564 A1 * | 6/2008 | Herrmann ..................... | 370/310 |
| 2008/0144493 A1 * | 6/2008 | Yeh ............................... | 370/230 |

FOREIGN PATENT DOCUMENTS

WO    WO 03/065236    8/2003

OTHER PUBLICATIONS

Dong Wu, Bashir M. Al-Hashimi, Marcus T. schmitz "Improving routing efficiency for network on chip through contention aware input selection"Publications Date: Jan. 24-27, 2006 Design Automation, 2006. Asia and South Pacific Conference on.*

(Continued)

*Primary Examiner* — Chi H Pham  
*Assistant Examiner* — Fan Ng  
(74) *Attorney, Agent, or Firm* — Nixon Peabody LLP

(57) ABSTRACT

A network and a data transmission method between elements in such a network using an asynchronous communication protocol of the "send/accept" type. At least one node in the network operations without an internal clock, this node determining a transfer hierarchy between two data packets to be routed to the same output, at least as a function of a priority channel information associated with each data packet.

28 Claims, 5 Drawing Sheets

OTHER PUBLICATIONS

"Asynchronous network node design for network on chip" Xin Wang, David Siguenza-Tortosa, Tapani Ahonen, Jari Nurmi Publication Date: Jul. 14-15, 2005 Signals, Circuits and Systems, 2005. ISSCS 2005. International Symposium on.*

French Search Report, based on FR 05 50611, Jul. 25, 2005.

Bolotin et al., "Cost Considerations in Network On Chip," Integration, the VLSI Journal, North-Holland Publishing Co., Amsterdam, NL, vol. 38, No. 1, Oct. 2004, pp. 19-42.

Bystrov, A. et al., "Priority Arbiters," University of Newcastle, IEEE, ASYNC 2000, pp. 128-137.

Bainbridge, John et al., "CHAIN: A Delay-Insensitive Chip Area," Proceedings of Int. Symposium on Advanced Research in Asynchronous Circuits and Systems, IEEE, Micro, Sep.-Oct. 2002, pp. 16-23.

Felicijan, Tomaz et al., "Quality of Service (QoS) for Asynchronous On-Chip Networks," University of Manchester, Oxford, UK, Sep. 2003, 7 pages.

Glass, Christopher J. et al., "The Turn Model for Adaptive Routing," ACM, Michigan State University, 2002, pp. 278-287.

Moore, Simon et al., "Point to Point GALS Interconnect," Proceedings of $8^{th}$ ASYNC, 2002, 7 pages.

Rijpkema, E. et al., "Trade Offs in the Design of a Router with Both Guaranteed and Best-Effort Services for Networks on Chip," IEE Proceedings of DATE Conference, vol. 150, No. 5, Sep. 2003, pp. 294-302.

Abrial, A. et al., "A New Contactless Smartcard IC Using An On-Chip Antenna And An Asynchronous Micro-Controller," 4 pages.

Banerjee, Nilanjan et al., "A Power and Performance Model For Network-on-Chip Architectures," Proceedings of the Design, Automation And Test In Europe Conference And Exhibition, 2004, 4 pages.

Duc, Anh Vu Dinh et al., Synthesis Of QDI Asynchronous Circuits From DTL-Style Petri-Net, IWLS-02, $11^{th}$ IEEE/ACM International Workshop On Logic & Synthesis, New Orleans, Louisiana, Jun. 4-7, 2002, pp. 191-196.

Duc, Anh Vu Dinh, "TAST CAD Tools", Tima Laboratory, CIS group: http://www.tima.imag.fr/cis, ISRN: TIMA-RR—Feb. 7, 2001-FR, 46 pages.

Felicijan, Tomaz, An Asynchronous Low Latency Arbiter For Quality Of Service (QoS) Applications, ICM 2003, pp. 123-126.

Felicijan, Tomaz, "An Asynchronous On-Chip Network Router with Quality-of-Service (QoS) Support," IEEE 2004, pp. 274-277.

Martin, Alain J., "Synthesis Of Asynchronous VLSI Circuits," California Institute Of Technology, Computer Science Department, Caltec-CS-TR-93-28, 1991, 147 pages.

Renaudin, M. et al., "ASPRO-216: A Standard-Cell Q.D.I. 16-Bit RISC Asynchronous Microprocessor," Asinc 1998, 10 pages.

Rigaud, J-B. et al., "Modeling And Design Of Asynchronous Priority Arbiters For On-Chip Communication Systems," Tima Laboratory (France), pp. 313-324.

Rigaud, Jean-Baptiste, Specification De Bibliotheques Pour La Synthese De Circuits Asynchrones, Dec. 23, 2002, 203 pages.

Vivet, Pascal, Marc, "Une Methodologie De Conception De Circuits Integres Quasi-Insensibles Aux Delais: Application A L'Etude Et A La Realisation D'Un Processeur RISC 16-Bit Asynchrone," Jun. 21, 2001, 257 pages.

* cited by examiner

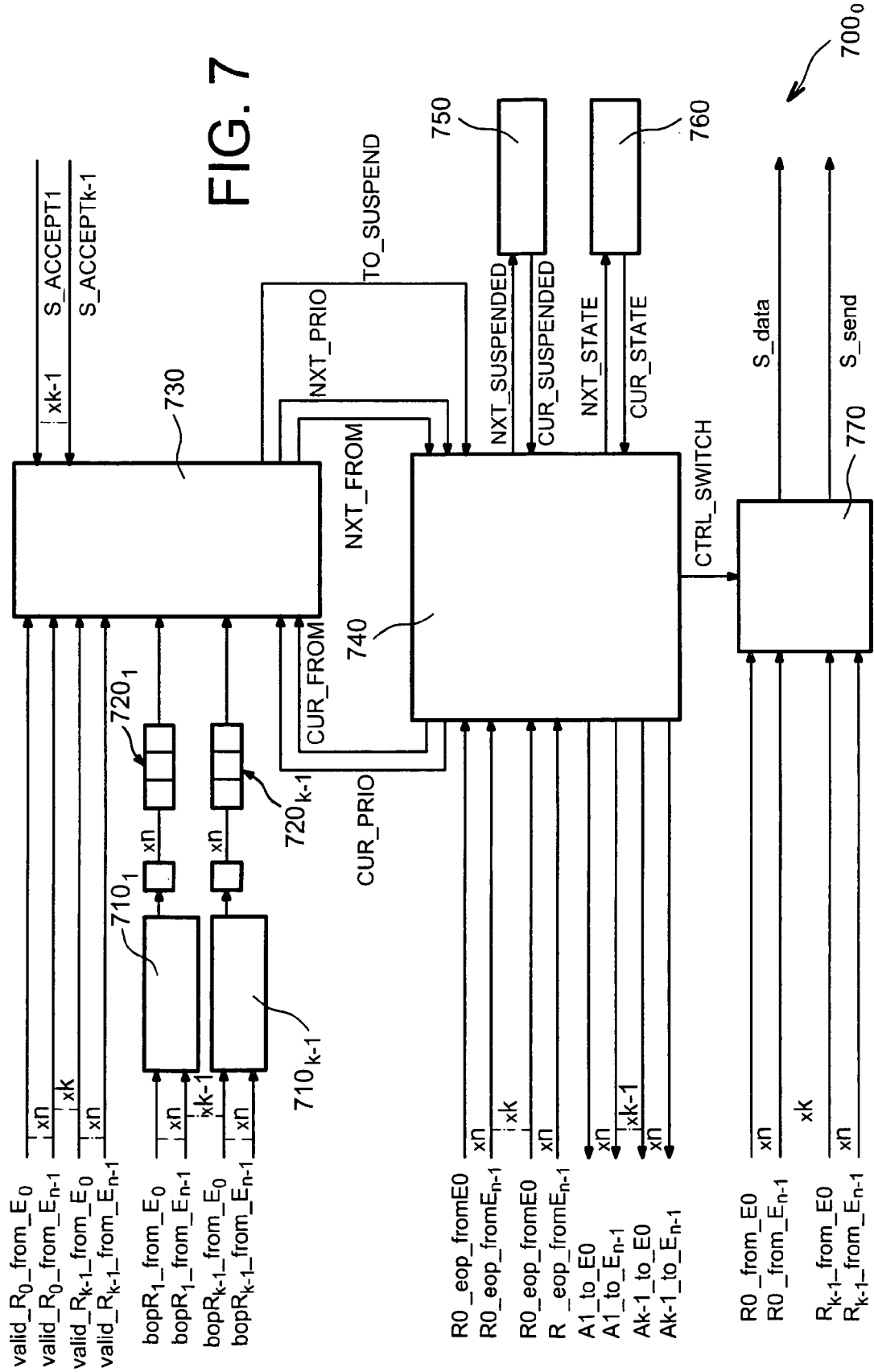

COMMUNICATION NODE ARCHITECTURE IN A GLOBALLY ASYNCHRONOUS NETWORK ON CHIP SYSTEM

CROSS-REFERENCE TO RELATED APPLICATION

This application claims priority to French Application No. 05 50611, filed on Mar. 8, 2005, entitled: "Communication Node Architecture in a Globally Asynchronous Network on Chip System" by Edith Beigne, Pascal Vivet, Marc Renaudin and Jerome Quartana and was not published in English.

TECHNICAL DOMAIN AND PRIOR ART

This invention relates to the domain of Networks on Chips (NoC). It relates to a network on chip structure provided with asynchronous nodes, communicating and operating without the use of a clock.

For example, a network on chip was proposed by Goossens et al. in "Trade offs in the design of a router both guaranteed and best-efforts service for networks on chip", Proceedings of DATE conference, 2003, p 350-355. In particular, this document describes a network on chip architecture provided with a communication medium with a matrix or mesh type topology. This communication medium comprises routing nodes that can be used to make two different routing types. A first routing type is used to provide a first type of service called a "guaranteed latency" time, in which the time spent by data to pass from a first resource to a second resource is approximately constant. A second type of routing is used to provide a second type of service, commonly called the "best effort", for which use of the capacity of network links connecting routing nodes is maximum. In this architecture, access to the communication medium is governed by a global network clock using time multiplexing. The use of such an architecture can be complex, particularly concerning the layout of its elements, and the production of its clock tree. It is also difficult to control the consumption of such a network, particularly to control consumption due to the clock tree.

One network on chip in which routing nodes communicate asynchronously with each other was proposed by Brainbridge and S. Furber in "Delay Insensitive System on Chip Interconnect" Using 1 of 4 Data Encoding", Proceedings of International Symposium on Advanced Research in Asynchronous Circuits and Systems, March 2001, pages 118 to 126. Data transiting in such a network are also encoded using an encoding type commonly called "one hot encoding". However, this network has the particular disadvantage that it uses a specific logic, which makes it difficult to produce. Furthermore, such a network does not use different service types, for example a "guaranteed" latency service and a service commonly called "best effort".

The documents <<Quality of Service (QoS) for Asynchronous On-Chip Networks>>, T. Felicijan, S. B. Furber, *Formal Methods for Globally Asynchronous Locally Synchronous Architecture (FMGALS* 2003) Pisa, Italy, September 2003, and <<An Asynchronous On-Chip Network Router with Quality-of-Service (QoS)*, T. Felicijan, S. B. Furber, *Support Proceedings IEEE International SOC Conference*, Santa Clara, Calif., September 2004, pp. 274-277, *ISBN:* 0-7803-8445-8 disclose methods of managing the quality of service in an asynchronous network on chip, using virtual channels.

The problem arises of finding a new network on chip structure with globally asynchronous operation, provided with elements and particularly nodes that do not use a clock to manage data transfers within it.

Such a structure should preferably be able to use different types of services, for example depending on whether it is preferred to have a fast data transfer between some resources or a fast transfer of some data, or if it is preferred to obtain a guaranteed throughput between some resources or for some data.

PRESENTATION OF THE INVENTION

The invention uses an improved network on chip structure.

Firstly, it relates to a data transmission method in a network on chip with an asynchronous communication protocol, this network comprises one or several nodes and one or several resources, each node being provided with one or several inputs associated with one or several input controllers, and one or several outputs associated with one or several output controllers, at least one of the nodes operating without an internal clock and determining a transfer hierarchy between two data packets to be routed to the same output, this hierarchy being determined at least as a function of a priority channel information associated with each data packet, this priority channel information and this data packet originating from another node or from a network resource, the priority channel information being transmitted by a first type of a synchronization signal according to said asynchronous communication protocol.

The asynchronous communication protocol may be a high level "send/accept" type protocol used by the resources and nodes in the network to make data transmissions.

The first type of signal may be a "send" type signal accompanying each elementary data group or associated with each elementary data group or "flit" in a data packet.

According to the invention, the synchronization and data transfer are done locally at the asynchronous node.

The network on chip structure according to the invention may be implemented in asynchronous logic which is not very sensitive to delays and is robust to power supply and temperature variations.

Preferably, the transfer hierarchy is determined when priority data channels are identical, by assignment of a priority level to each packet that depends on its time of arrival in the node and/or the input of arrival or the input port through which this packet arrives in the node.

According to one particular embodiment, when a first packet is being output from the node but has a lower priority level than the priority level of a second packet called the incoming packet, the output from the first packet may be interrupted or stopped and the second packet may be output in priority. Thus, there is a priority transmission of data in the highest priority channel.

Routing information, for example in the form of an ordered list of direction data, may be associated with each data packet, and some of this routing information, for example direction data in the list of direction data, being addressed is to each node passed through.

Preferably, the routing information for a node is read and used in this node, the other routing information addressed at nodes not yet passed through being prepared for example by offsetting the ordered list of directions, for the next destination of the data packet in the network.

Routing information is preferably at the beginning of the data packet.

This routing information may also be memorized in an input controller of the node passed through so that data can be transferred from the input controller to an output controller.

The asynchronous node may use means for memorizing routing information for the first packet for which the output is interrupted or stopped.

A method according to the invention may also include a second type of synchronization signal being sent by the node that receives one or several items of data to the element from which it received this or these data, for example an acceptance signal may be sent using said asynchronous communication protocol after reception and acceptance of the data and the synchronization signal.

The node does not send an acceptance signal for data to which the highest priority channel is assigned, which enables more flexible management of the system.

The asynchronous communication protocol may be used using a two-directional request/acknowledgement type signal system; every action is acknowledged by the receiver so that the sender can send again.

Therefore a network according to the invention can operate by also using an asynchronous low level "request/acknowledgement" type protocol.

Preferably, in such a method, the synchronization signals of the asynchronous communication protocol are implemented using a four-phase request/acknowledgement protocol, and multi-rail encoding.

The asynchronous node may be made practically insensitive to delays, for example by using this 4-phase protocol and this multi-rail encoding.

In a method according to the invention, when the input controller receives a beginning of a data packet to be transmitted, it sends a signal called the validity signal to the output controller for the output to which the data in the packet must be transmitted, this validity signal containing data related to the priority channel of said data packet to be transmitted.

After receiving the validity signal, the output controller then builds in a begin of packet request, for a data packet not forming part of the highest priority data packets in a queue of begin of packet requests, for data packets with the same priority channel.

The output controller, after reception of the validity signal, monitors registers in the input controller in which the data are stored as a function of their priority channel.

The input controller can memorize priority channel data in order to transfer data to the output controller.

The invention also relates to a data transmission device comprising a network on chip with an asynchronous communication protocol, this network comprising one or several nodes and one or several resources, each node being provided with one or several inputs associated with one or several input controllers, and one or several outputs associated with one or several output controllers, at least one of the nodes operating without an internal clock, each input controller of this node comprising:

means for determining a transfer hierarchy between at least two data packets to be routed to the same output, this hierarchy being determined at least as a function of a priority channel information associated with each data packet, means for receiving a synchronization signal comprising a priority channel information, and data packets from another node or network resource.

Such a device also comprises means for determining the transfer hierarchy, and comprises means for assigning a priority level to each data packet when priority channels are identical, depending on its time of arrival in the node and/or the input or the input port into the node. These means may be located in the node output controllers.

Means may also be provided to interrupt or suspend the output from a first packet when this first packet is being output from the node, but has a lower priority level than the priority level of a second packet called the incoming packet, so as to output the second packet in priority. These means may also be located in node output controllers.

The device according to the invention may also comprise means for decoding routing information, for example in the form of an ordered list of direction data associated with each data packet, some of this routing information being addressed to each node passed through.

Means may also be provided to read the routing information related to a node, and means for preparing other routing information for the next destination of the data packet in the network. In one case, for example, in which the routing information is in the form of an ordered list of direction data, these means may be used to offset the ordered list of directions, for a next destination of the packet, for example an adjacent node.

Means are used to memorize routing information in the input controller of a node passed through, in order to transfer data from the input controller to the output controller.

The asynchronous node preferably has means for memorizing routing information for the first packet for which the output is interrupted or stopped.

According to one preferred embodiment, it also comprises means for sending an acceptance signal to the element from which it receives one or more data items when it receives these data, after reception of the first type of synchronization signal or the corresponding send signal and acceptance of data.

Preferably, the input controller comprises means for sending a signal called the validity signal to the output controller for the output to which data is to be sent, when it receives a begin of packet for data to be transmitted, this validity signal comprising data related to the priority channel of said data to be transmitted.

In an asynchronous node of a device according to the invention, the output controller may comprise means for incorporating a begin of packet request for a data packet that does not form part of the data packets with the highest priority channel, in a queue of begin of packet requests belonging to data packets with the same priority channel, after receiving a validity signal.

The output controller may also comprise means for monitoring registers of the input controller in which data are stored as a function of their priority channel, after reception of a validity signal.

It may also comprise means for memorizing priority channel data so that it can transfer data towards the output controller.

BRIEF DESCRIPTION OF THE DRAWINGS

This invention will be better understood after reading the following description of example embodiments given purely for guidance and that are in no way limitative, with reference to the appended figures, wherein:

FIG. 6 shows an input controller and FIG. 7 shows an output controller for an asynchronous node according to the invention;

Identical, similar or equivalent parts of the different figures are marked with the same numbers so as to facilitate comparisons between the different figures.

The different parts shown in the figures are not necessarily drawn at the same scale, to make the figures more easily understandable.

DETAILED PRESENTATION OF PARTICULAR EMBODIMENTS

Figure 1A:
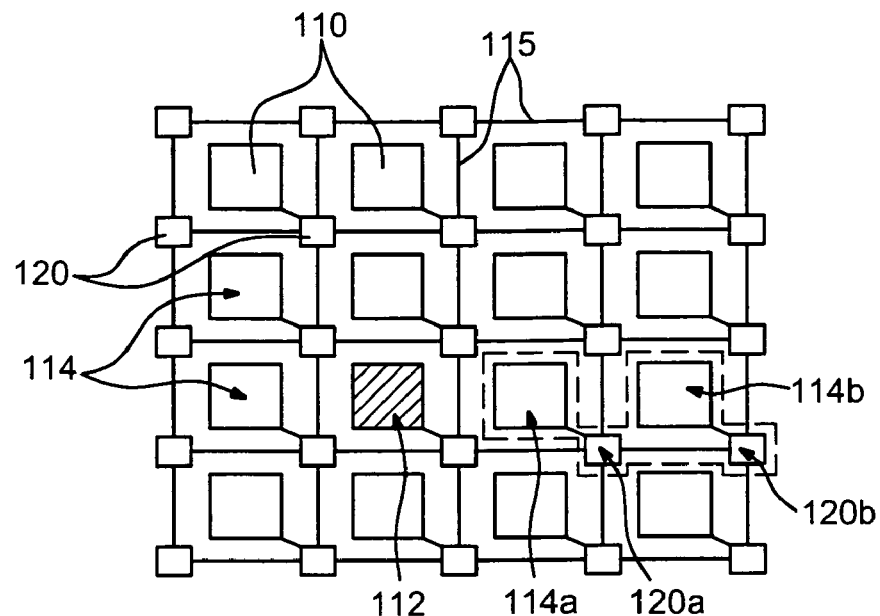
FIGS. 1A, 1B show examples of the network on chip architecture used according to the invention.

FIG. 1A shows an example of a communication or network on chip (NoC) architecture used according to the invention and provided with a matrix or mesh type topology.

This architecture comprises a plurality of elements referenced 110 capable of processing data, and communicating with each other particularly by exchanging data.

The set of elements 110 included in such an architecture may include an element denoted 112 acting as master and used particularly to initiate communications on the network. This element 112 that will be called the "network controller" can thus program communications between a plurality of other network elements that will be called "resources" 114a, b and that can be used to perform tasks such as processing of elementary data, for example calculations, or for data storage or for encoding/decoding of data.

The network controller 112 may for example be in the form of a processor or a micro controller. Some of the particular functions performed by the micro controller may include calculations and interrupt management.

Each resource 114a, b may be generic, for example it may be in the form of a processor or a Digital Signal Processor (DSP) or it may be specific, for example such as a memory, for example a Static Random Access Memory (SRAM).

It may also be a special purpose processing module, for example such as a module specialized in the calculation of a Fast Fourier Transform (FFT) or for example such as an MPEG (Moving Pictures Expert Groups) encoder and/or decoder module.

The network resources 114a, b are connected together and exchange data between themselves through a communication medium comprising two-directional links 115, formed from one or several links providing data transfer in one direction and one or several other links providing data transfer in an opposite direction.

The network also comprises nodes 120. These nodes 120 are used to set up a physical connection between one or several incoming links and one or several outgoing links, and switching of communications between the resources 114.

With the so-called "mesh" or matrix technology illustrated in FIG. 1A, each node 120 is connected to four other adjacent nodes and is connected or associated with one of the resources 114.

This network architecture has a globally asynchronous locally synchronous (GALS) type operation; communication between the different resources is asynchronous.

According to one possible embodiment, the resources 114a, b of the network structure may be synchronous units of the network governed by a clock. The clocks for each resource may be distinct or independent of each other.

The network communication medium, and particularly nodes 120, can be implemented in asynchronous logic. One or several or all nodes 120 of the network do not have a clock and operate asynchronously.

For data switching in the network, nodes 120 can be used for data routing.

Thus, a node in the network can use data called routing data contained in a received data packet, to determine the link or adjacent node in the network to which this data packet that it receives should be transmitted or sent.

For example, routing within network nodes may be deterministic. In this case, each node in the network can route a data packet only or principally as a function of routing information contained in the data packet that it receives. This routing information indicates the path, for example in the form of an ordered list of directions to be taken, that this data packet will take in the network and may have been introduced into the packet or assigned to the packet by a network resource that sent this packet.

One or several nodes 120 in the network are also capable of arbitrating between data, in other words can determine which of several data packets that it receives should be transferred or transmitted first.

Therefore, an asynchronous node in the network may be designed to manage any conflicts between data arriving to it, and determine which of several data or data packets arriving at it and intended to use the same output from this node or the same link attached to this node, will be transmitted first to this output or this link first.

The network on chip architecture used according to the invention is not limited to the mesh topology illustrated in FIG. 1A and it may have any other topology, for example a hypercube, tree, ring or torus type topology, etc.

Figure 1B:
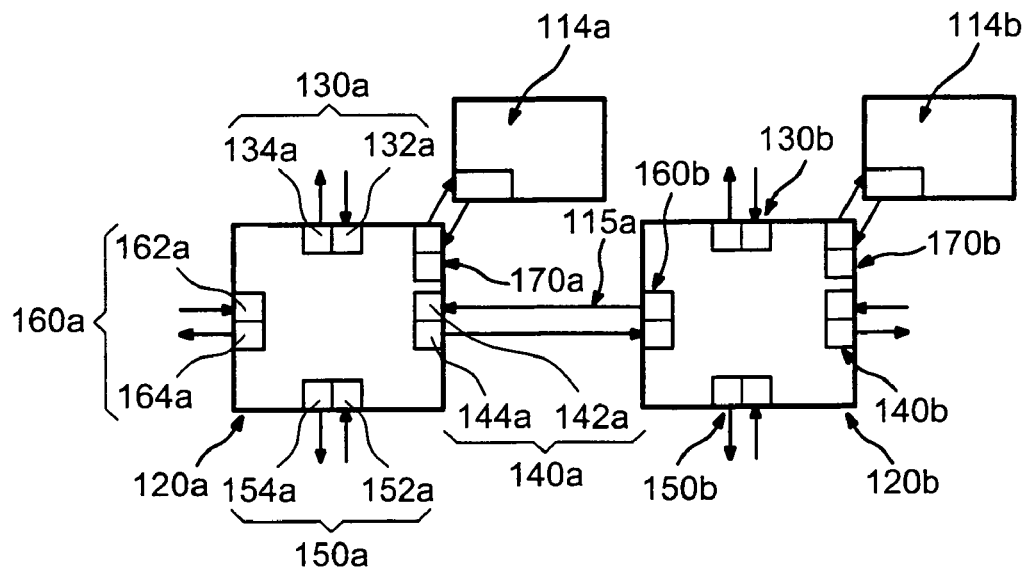

FIG. 1B shows a portion of the network described above with reference to FIG. 1A, and particularly a first node 120a and a second node 120b adjacent to each other, neither of which has an internal clock.

The first node 120a and the second node 120b, are connected to a first resource 114a and a second resource 114b respectively, each comprising 5 input/output modules designed to receive and/or send data and/or synchronization signals, of which a "north" module denoted 130a for the first node and 130b for the second node, an "east" module for the first and second nodes 140a, 140b respectively, a "south" module for the first and second nodes 150a, 150b respectively, and a "west" module for the first and second nodes 160a, 160b respectively. These input/output modules are connected to other nodes in the network. An input/output module 170a, 170b is connected to a resource 114a, 114b respectively.

In this configuration, each node comprises 5 inputs (denoted 132a,b 142a,b 152a,b 162a,b 172a,b for the first node 120a), and 5 outputs (denoted 134a,b 144a,b 154a,b 164a,b 174a,b for the first node 120a).

Each node comprises 5 input controllers and 5 output controllers.

Each input is connected to only 4 of the 5 outputs, knowing that a forward/return path on the same input/output module is not allowed. An input controller detects the presence of new data to be processed and transfers these data to an output as a function of the routing indicated in the data, preferably in the header of the current packet.

In each of the architectures described above, data exchanged between resources 114a,b and that transit through links 115a,b and nodes 120a,b may be in the form of data packets.

A packet is formed from a data group commonly called a "flit" or several successive data groups or "flits" that will follow the same path.

A flit is the elementary unit used for data transmission in the network. There is capacity of a link 115 or a number of physical connections or wire links within a link 115, corresponding to a flit or elementary data group.

A data packet circulating in the network generally comprises at least one flit denoting its header, and at least one flit denoting its end, and possibly one or several intermediate flits between the header flit and the end flit.

A data packet may possibly be formed from a single elementary data group or a single flit. In this case, this single flit denotes both the header and the end of packet.

An elementary data group or flit usually comprises several bits, for example 34 bits, and particularly so-called "information" bits used to denote the position of this flit in a packet.

A first information bit called the "Bop" (begin of packet) bit may for example be used to denote whether or not the flit to which this "bop" bit belongs is a begin of packet flit.

Another information bit called the "EoP" (end of packet) bit may be used for example to denote whether or not the flit to which this bit belongs is an end of packet flit.

A data packet flit may also comprise several other data bits apart from information bits, for example comprising information about a calculation and/or data processing and/or address information, and/or programming information that will be used to configure operation of a resource 114.

A data packet header flit, apart from position information bits, comprises several specific bits that will be called "message control" bits that indicate the nature of the packet, depending on whether this packet corresponds to a read, write or interrupt packet.

A data packet header flit also comprises several other specific routing bits, for example 18 routing bits, also called "path to target" bits.

In the header flit, path to target bits indicate the path that the data packet to which this header flit belongs will follow in the network. For example, this path may be in the form of an ordered list of direction data, or an ordered list denoting the sequence of input/output modules that the packet will follow.

A node may be set up firstly to use part of the list of direction data defining the path to be followed, for example two low order bits from the "path to target", and secondly to route the packet to one of its modules and to offset the list for the next node.

For example, one encoding system that could be used would be "00" to denote a "north" input/output module, "01" to denote an "east" input/output module, "10" to denote a "south" input/output module and "11" to denote a "west" input/output module.

A specific system for encoding of routing bits may be used to notify a node that it should route a data packet to a resource, particularly to reduce the number of routing bits in a packet. For example, two identical consecutive data in an ordered direction list can denote a resource.

As mentioned above, routing of data packets in the network may be of the deterministic type. Thus, before sending a data packet, a resource can set up a path that this data packet will follow. The resource does this by attributing or assigning a value to the "path to target" bits of the header flit in the data packet that it sends.

The data stream that will pass through one of the previously described networks during execution of processing or an application, may be of the type commonly called a "wormhole", for example as described in the document "*A survey and comparison of wormhole routing techniques in Mesh networks*, K. M. Al-Tawil and al., *IEEE network*, March-April 1997, pp 38-45). For this type of data stream, the header flit in a data packet sent by a sending resource to a receiving resource will firstly set up the path between the sending resource and the receiving resource, and then will possibly send one or several intermediate flits distributed in the network nodes already followed by the header flit. The end flit closes the path followed by the data stream.

Each data packet transiting through the network may be associated with a priority channel called a "virtual channel" chosen from among a predetermined list of one or several different virtual channels, for example two or three different virtual channels. Each virtual channel relates to a priority level or a priority number, and confers a priority degree to a data packet with which it is associated, particularly concerning arbitration of the transfer order for the packet when this packet reaches a node in the network.

For example, a first data packet accessing the first node in the network, for example associated with a first channel with a given priority level, could be transferred at the output from this first node in priority over another data packet for example associated with a second channel with a lower priority level than the first channel, particularly in the case in which the first packet and the other packet are preparing to access the same output from the first node.

According to one possible implementation of virtual channels, there could be k different virtual channels (where k is an integer number more than 2) for example a first channel or channel 0 with the highest priority level, a second channel or channel 1 with a lower priority level than the first channel, a third channel or channel 2 with a lower priority level than the first channel and the second channel, etc.

Virtual channels can be used to provide different data transfer services in the network, for example at least a "best effort" service, for which the pass band or network access is shared or distributed more or less equitably between the resources, and at least one so-called "guaranteed latency" service for which data associated with this service are transferred in the network, for example from a first resource to a second resource, with a transfer duration that is approximately constant or does not vary very much.

Thus, for an implementation with two virtual channels, the highest priority channel, for example the first channel, may be used to provide a guaranteed latency service, while the second channel with a priority level lower than the first channel may be used to provide a "best effort" type service.

The priority channel information is associated with a data packet using at least one synchronization signal according to a communication protocol that will be described later with reference to FIG. 2.

The transfer order between data packets associated with different priority channels may be given by means for an asynchronous node, particularly an input controller and an output controller for this node, as a function of priority channel information. Examples of such controllers will be described later with reference to FIGS. 6 and 7.

It would also be possible to assure that two data packets associated with the same priority channel, for example a first packet associated with the first channel and a second packet also associated with the first channel, do not mutually interrupt each other, particularly when these packets access the same network node.

The transfer order between several data packets, when these packets are associated with identical priority channels, is not imposed and may for example be made using a "dynamic" arbitration, for example of the first in first out (FIFO) type.

A transfer order using a "static" type arbitration could also be used. For this type of arbitration, the node takes account of the adjacent node from which said data packets arrive, or of its inputs from which the packets arrived. This static arbitration type may be used particularly in addition to the arbitration made using virtual channels, for example to determine the transfer order between several different packets associated with the same virtual channel and that arrive at the node simultaneously or at approximately the same time. Such static arbitration could for example be of the "north/east/south/west" type, for which a packet originating from the "north" input of the node takes priority over a second packet in the same virtual channel arriving at the same time as the first packet arrives at the "east" input of the node, the second packet itself taking priority over a third packet from the same virtual channel arriving at the same time as the second packet at the "south" input of the node.

More generally, it is possible to make arbitration between different packets with identical priority channels as a function of corresponding origins of the data packets.

One possible operation of the node, for example node 120a in FIG. 1B may be as follows: when a header flit for a first data packet arrives through an input to this node 120a, the output from the node that this first packet will take is determined as a function of routing information included in the header of said first packet. An arbitration function is activated as a function of this routing information and the priority channel with which this first packet is associated.

If there are no conflicts on said output, and for example if no other packet uses this output or is getting ready to use this output, the first packet is transmitted or transferred to this output.

If there is an access conflict on said output, a first packet already using an output from the node, and a second packet in a virtual channel with a higher priority than the priority of the first packet arriving in the node for the same output, the transfer of the first packet at the output from node 120a is blocked or stopped to transfer the second packet. The transfer of the first packet can resume when all flits in said second packet have passed through the node 120a.

In another case in which there is a conflict on said output, and for example in which another header flit in a second packet belonging to the same virtual channel as the first packet is getting ready to use this output at the same time as the first packet, a static arbitration or function of the origin of the packets or their input into the node may be made between the packets. For example, it could be a "north", "east", "south", "west" type arbitration.

The priority channel information with which a data packet might be associated, may be at least partially contained in synchronization signals of a high level "send/accept" type communication protocol used to make data transfers between elements, nodes and/or resources, in the network.

Figure 2:
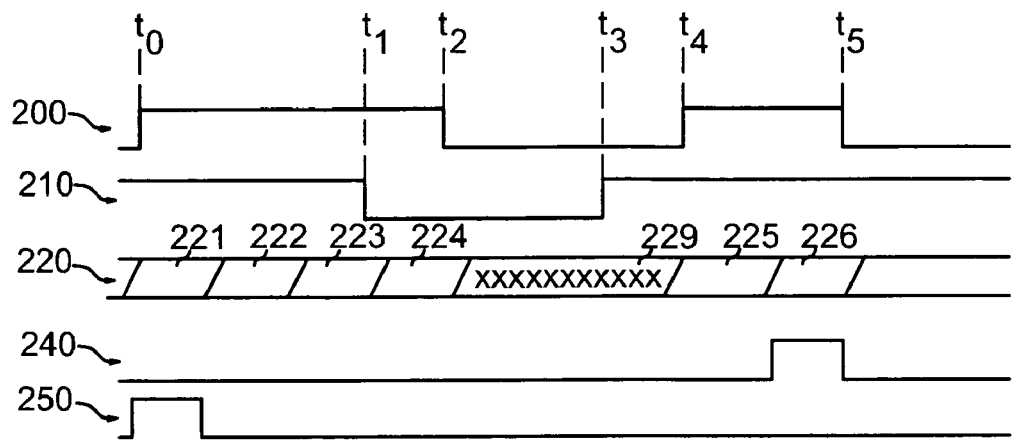
FIG. 2 shows an example of a time diagram illustrating a synchronization mechanism using a "send/accept>>" type communication protocol in a network on chip used according to the invention, between a data sending element and an element receiving said data.

A data transfer mechanism between an element in the data sending network, for example a first node or a resource and an element in the data receiving network, for example a second node adjacent to the first node, is illustrated in the time diagram in FIG. 2. The data transfer between the sending element and the receiving element is governed by a high level "send/accept" type protocol using "send" type synchronization signals, and "accept" type synchronization signals, for which a given flit or an elementary data group in a data packet may be sent by the sending element as soon as another flit preceding this given flit in said packet has been accepted by the receiving element.

The curves 200 and 210 in the time diagram are representative of synchronization signals exchanged between the sending element and the receiving element. The curve 220 is representative of data exchanged between the sending element and the receiving element.

On this time diagram, a send signal 200 that originates from the sending element, announces that data are sent to the receiving element, at time $t_0$, for example when this send signal changes to a high state. An acceptance signal 210 that will be called the "accept" signal originating from the receiving element indicates that the receiving element is ready to receive these data, for example by being in a high state at this time $t_0$. Thus, as shown by curves 220 and 230 respectively, a first data group or a first flit is sent by the sending element and is received by the receiving element (the first flit being represented by a portion 221 of the curve 220).

A curve 250 on the time diagram representative of a "bop" signal changes from a high state at time to and remains in the high state throughout the duration of the first flit. This "bop" signal indicates that the first flit is a header flit. A second flit and then a third flit are then sent by the sending element and are received by the receiving element (the second flit and the third flit being represented by the portions 222 and 223 respectively of the curve 220).

At time $t_1$, the "accept" signal 240 sent by the receiving element changes state, and for example changes to a low state. The receiving element then stops receiving data. The sending element makes an attempt to send a fourth flit (portion 224 of the curve 220) but the receiving element does not send the acceptance signal for this fourth flit to the sending element. For example, in the case in which the receiving element is a synchronous node, this node can receive and save the fourth flit while waiting until it can be used. In another case, for example in which the receiving element is an asynchronous node, this node can maintain the fourth flit in the sending element, by not acknowledging this fourth flit.

After this send attempt, the sending element stops sending data at time $t_2$ (portion 229 of curve 220).

The receiving element is once again ready to receive data starting from time $t_3$. This is indicated by the "accept" signal (curve 210), that changes state and for example changes to the high state. Starting from this time $t_3$, the receiving element indicates that it accepts the fourth flit (portion 234 of the curve 230). The sending element can then send data again. Starting from time $t_4$, the element sends a fourth flit (portion 225 of the curve 220) and then a fifth flit (portion 226 of the curve 220) that are then received by the receiving element. As indicated by the curve 240 representative of an "eop" (end of packet) signal, the fifth flit marks the end of packet and sends data at time $t_5$.

In other words, data sent between a first element and an asynchronous node are managed by a send/accept protocol. In the transmission mechanism that has just been described, the sending element and the receiving element communicate through input/output modules, for which exchanges are managed at physical layers by a two-directional "request/acknowledgement" type signaling.

This two-directional signaling may be used through a low level "four-phase" protocol also called a "full hand-shake".

Figure 3:
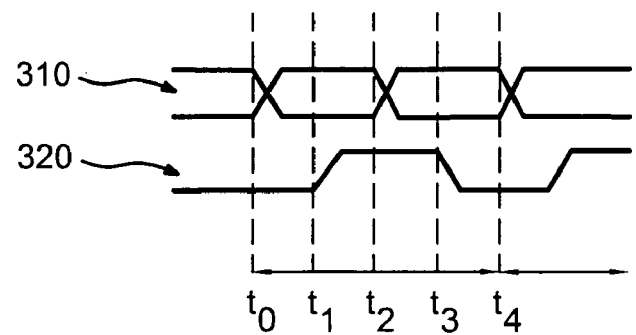
FIG. 3 shows an example transfer according to a 4-phase protocol.

One operation of this protocol is illustrated by the time diagram in FIG. 3. The curve 310 of this time diagram represents data signals in which request signals produced by the sending element appear, while the curve 320 is representative of the acknowledgement signals produced by the receiving element.

In a first phase, between a time $t_0$ and a time $t_1$, the receiving element detects the arrival of new data represented by a state change of the curve 310, and acquires these data. This receiving element then generates an acknowledgement signal and sends it to the sending element, as shown by the change of state of the curve 320 at time $t_1$.

Then in a second phase between time $t_1$ and time $t_2$, the sending element detects the acknowledgement signal or the change of state of the acknowledgement signal, and invalidates the data for the receiving element, as shown by the change of state of the curve 300.

Then in a third phase between time $t_2$ and time $t_3$, the receiving element detects when data change to an invalid state and puts the acknowledgement signal into its initial state or into a state in which this signal was at the beginning of the first phase.

Then in a fourth phase between time $t_3$ and time $t_4$, the sending element detects that the acknowledgement signal has been put back into its initial state or into the state in which this signal was during the first phase, and is then once again authorized to send new data.

Data and/or synchronization signals transiting in the network may be encoded according to an encoding type insensitive to delays that will be called "multi-rail" or "1 among N", and that is used to enable nodes to:
  detect the presence of new data arriving at the nodes,
  and to distinguish cases in which new data arriving at their input are in exactly the same state as previous data.

This type of encoding also enables a node to generate an acknowledgement signal to inform its adjacent nodes about the end of a processing.

Figure 4:
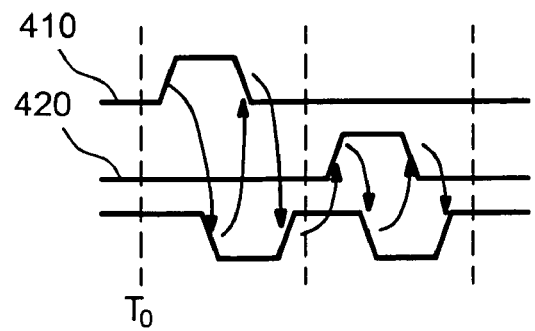
FIG. 4 shows double rail encoding signals.

For example, for a double-rail encoding like that illustrated in FIG. 4, a data bit is encoded with 2 wires, on which four states are a priori available. A first wire (denoted by a signal reference 410 in FIG. 4) may be provided to encode a value '0' of the data bit, while a second wire (signal reference 420 in FIG. 4) encodes the value '1'.

When a low state is present on the two wires, there is no valid value (signals 410 and 420 at logical level 0 before the time reference $T_0$. When the first wire changes state and for example changes to a high state, this wire encodes the value '0', the second wire in the high state indicates the value '1'. A high state on both wires at the same time is not allowed. Each valid value change can only be made by passing through the invalid state in which the two wires are in the low state.

Figure 5:
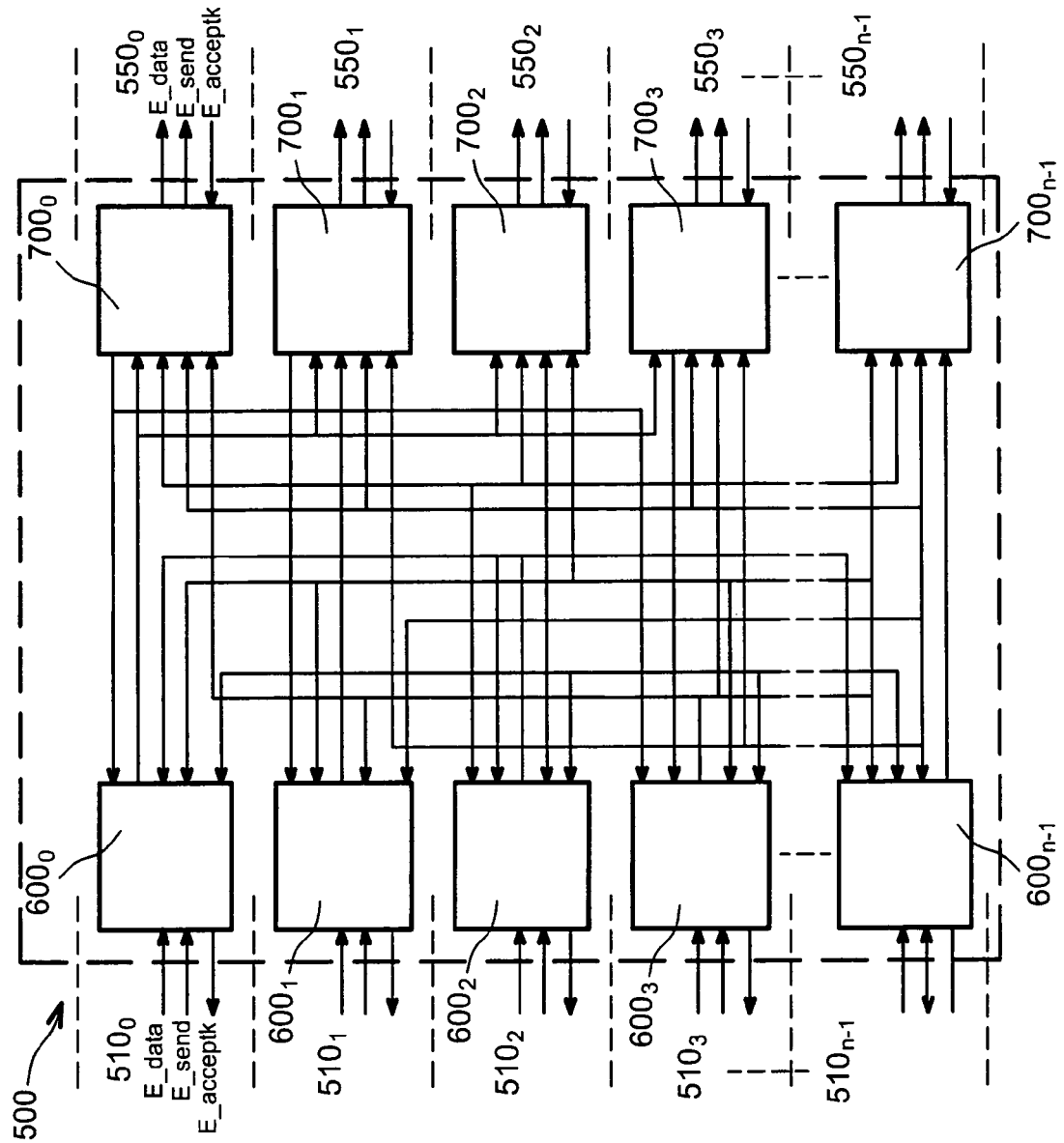
FIG. 5 shows an example of an asynchronous node structure in a network on chip used according to the invention.

FIG. 5 illustrates the architecture of an asynchronous node; each input is connected to (n−1) outputs and each output is connected to (n−1) inputs, for example where n is greater than or equal to 4, and therefore the node may comprise more than 5 inputs and outputs.

An example of such a node 500, attached to n links (where n is an integer more than 5) is shown in this FIG. 5 (the links not being shown in this figure). This node 500 may have an architecture of the n by n "crossbar" type comprising n inputs $510_0, \ldots, 150_{n-1}$ and n outputs $550_0, \ldots, 550_{n-1}$, each of the inputs $510_0, \ldots, 510_{n-1}$ being connectable to n−1 outputs. k priority channels can be implemented in this network variant (where k is an integer greater than or equal to 2). Thus, each of the data packets transiting through such a network variant may be associated with one priority channel chosen from among k channels or priority levels.

Such a node 500 can use a static arbitration to determine a transfer order between packets belonging to the same channel, and particularly to the highest priority channel, for example a packet from input $510_0$ associated with the highest priority channel 0, can be determined as taking priority over another packet associated with the same channel 0, and originating from input $510_1$.

Each input $510_0, \ldots, 510_{n-1}$ of node 500 is associated with a corresponding input controller $600_0, \ldots, 600_{n-1}$, while each output $510_0, \ldots, 510_{n-1}$ is associated with a corresponding output controller $700_0, \ldots, 700_{n-1}$.

According to one example embodiment of the node illustrated in FIG. 5, that can govern k=2 different levels or priority channels and that can receive flit packets, for example 34-bit flits, the data buses of the node receiving packets in the form of E_data signals and data buses of the node sending packets in the form of E_send signals, may be encoded in base 4 so as to reduce consumption and so as to obtain 17 multi-rail base 4 vectors for 34 data bits.

The E_send control signals of the "send" type may be used with double-rail encoding to transport two different virtual channel numbers or different priority channel numbers. The S_acceptk control signals of the "accept" type may be used with single rail encoding to indicate whether or not there is any space available again in the next node.

Figure 6:
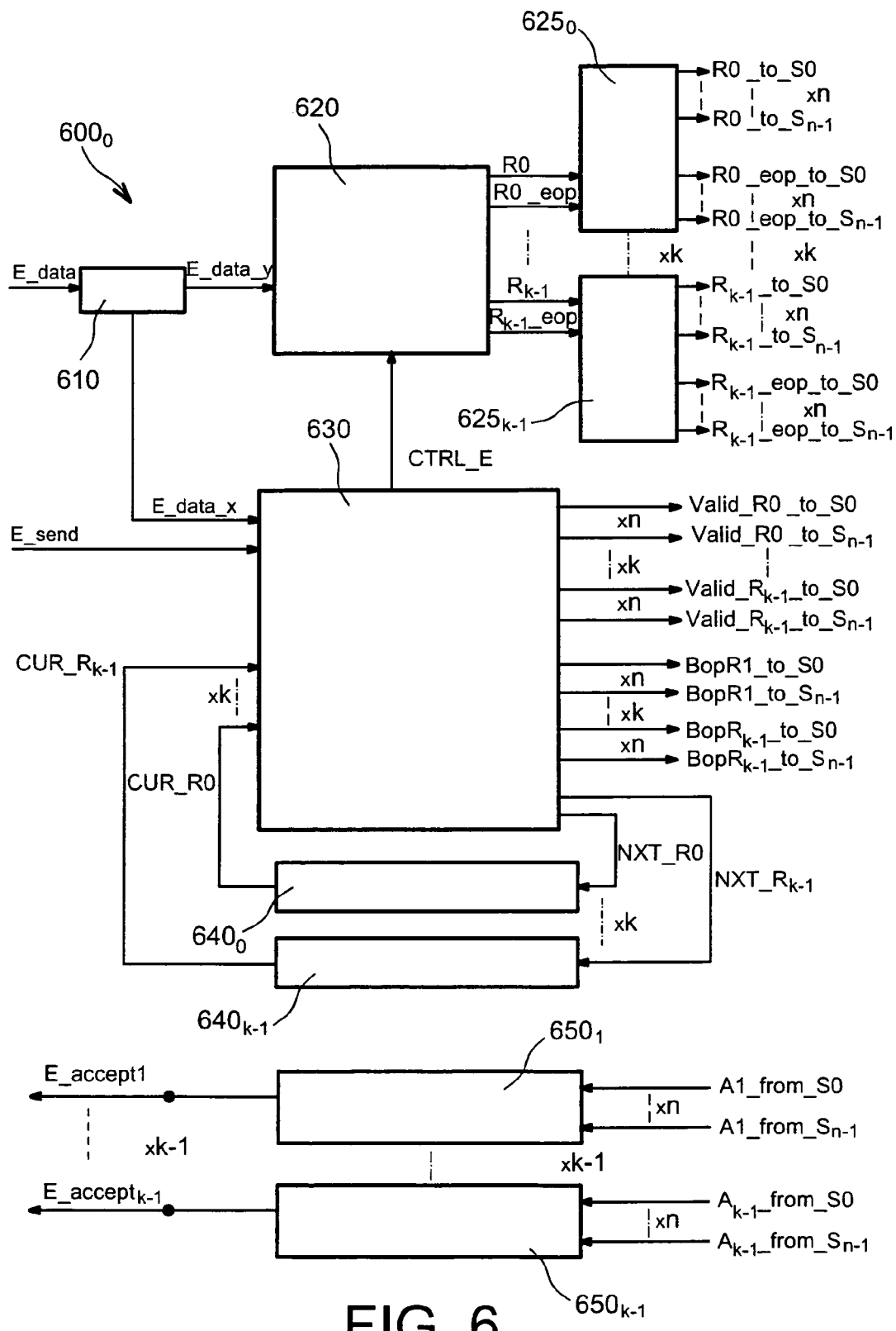

An architecture of an input controller $600_0$ of the asynchronous node 500, is shown in more detail in FIG. 6.

This controller $600_0$ is used to transfer a given flit present on its input $510_0$ to a given output, or from a given output controller among a set of n−1 outputs or output controllers $700_1, \ldots, 700_{n-1}$ (see FIGS. 5 and 7) of this same asynchronous node 500.

Therefore, the input controller $600_0$ receives a data flit for a packet in the form of an E_data signal, for example with 34 bits to which a "send" type synchronization signal denoted E_send is attached, from the input $510_0$ with which it is associated (not shown in FIG. 6).

As already mentioned above, remember that both the E_data data and the E_send synchronization signal are sent by a node or a resource connected to the input $510_0$ preceding the asynchronous node 500 in the path that follows the data packet in the network.

The input controller $600_0$ also generates "accept" type acceptance signals (E_accept1, ..., E_acceptk in FIG. 6) to the adjacent element (node or resource) of the asynchronous node 500 connected to the input $510_0$, and from which data received by this node 500 originate.

The controller $600_0$ comprises a module or means 610 for duplicating at least part of a flit, incoming in the form of the E_data signal, into several flits, for example two signals E_data_y and E_data_x, intended for a module or means 620 respectively, called the new data acquisition means, and another module or means 630 called synchronization signal acquisition means.

The means 630 receive the E_send synchronization signal with which the incoming flit is associated and that comprises the level or priority channel of the packet to which this flit belongs, in code form. The source of this signal has already been described above. Thus, these means 630 are used particularly to decode the level or priority channel of a given flit of a packet incoming into node 500.

The means 630 can also decode some bits in the given flit, particularly some routing bits of this flit of a "path to target" field, for example including an ordered list of direction data, for example low order bits in the "path to target" field.

After the means 630 have decoded the bits in the "path to target" field, these means 630 generate:
  firstly, an output validation signal Valid R0_to_S0, ..., Valid_Rk−1_to_Sn−1, (subsequently abbreviated to Valid_R_to_S) to validate a priority channel among the k priority levels and an output among the outputs from the node that the incoming flit will follow as an output from the asynchronous node;

secondly, begin of packet information BopR1_to_S0, ..., BopRk−1_to_Sn−1, (subsequently abbreviated to BopR_to_S) to send it to an asynchronous node output controller.

This output controller is also provided with:

information related to the priority channel of the flit, information concerning the position of the flit in a packet, for example if this flit is a begin of packet flit or an end of packet flit.

If the E_data_x flit is a begin of packet flit, the means 630 generate a control signal CTRL_E, to notify the data acquisition means 620 about the priority channel with which the incoming packet is associated, and an offset control of the bits in the "path to target" field.

Low order bits in the incoming flit "path to target" field that indicate the destination, are also decoded by the means 630. These data destination bits are used to generate a Valid_R_to_S validation signal and a begin of packet information, except for packets associated with a higher priority level or channel that may arbitrated differently. The two signals related to the validity information and the begin of packet information, activate the output concerned on the current priority level.

The information about this output is memorized in the registers $640_0, \ldots, 640_{k-1}$, after having been generated by means 630 in the form of a destination information signal NXT_Rk. This signal NXT_Rk sent in one of the registers $640_0, \ldots, 640_{k-1}$, is used to keep routing data for the remainder of the incoming packet.

If the incoming flit is not a begin of packet flit, the means 630 generate a control signal CTRL_E, that then indicates only the level or priority channel of the incoming flit. The current destination, memorized as described above, is read (signal CUR_Rk sent by the means $640_0, \ldots, 640_{k-1}$), in order to activate the current output with the priority level concerned.

When the means 620 receive the E_data_y signal, they offset the bits in the "path to target" of the header flit of a given incoming packet into node 500, depending on the value of the CTRL_E signal produced by the means 630. This is used to prepare routing information for the given packet for another node adjacent to node 500, that the given packet will pass through after node 500. After being offset, the low order bits in the header flit of "path to target" notify the next node which of its outputs the data packet will take.

The means 620 also use the control signal CTRL_E to orient data in a flit to a given module or to given means among a set of k means $625_0, \ldots, 625_{k-1}$, for example communication channels, as a function of the priority channel with which this flit is associated. For example, a flit associated with the highest priority channel, for example channel 0, is oriented towards means $625_0$ provided to process flits associated with channel 0. The means 620 can thus perform a classification of incoming packets by virtual channel or priority channel, through the input with which they are associated in the node 500.

The means 620 are also used to decode and then duplicate the "eop" end of packet bit in the header flit of a given incoming packet, so that it can be used by a state machine (not shown in FIG. 6) of a node output controller.

The means or registers $625_0, \ldots, 625_{k-1}$ are used to transfer data output from means 620 to one of the n−1 output controllers $700_1, \ldots, 700_{n-1}$ of node 500. This is done, by probing the means $625_0, \ldots, 625_{k-1}$ by the n−1 output controllers $700_1, \ldots, 700_{n-1}$, using a probing mechanism of the type described in the document by P. Vivet, "A Quasi-Delay Insensitive Integrated Circuit Design Methodology: Application to the Study and Design of a 16-Bit Asynchronous RISC Microprocessor", Thesis, INPG, 2001. This probing is done by output controllers $700_1, \ldots, 700_{n-1}$, when these output controllers are activated by validation signals sent by means 630.

The input controller $600_0$ also comprises means $650_1, \ldots, 650_k$ to probe acceptance signals on the different channels or priority levels from each of the outputs A1_fromS0, ..., Ak−1_fromSn−1 to generate an acceptance signal E_accept1, ..., E_acceptk−1. These means $650_1, \ldots, 650_k$ can operate according to a probing mechanism like that described above. Furthermore, these means $650_1, \ldots, 650_k$ are designed to generate an initialization token, before a "send/accept" type exchange like that described above. The input controller $600_0$ then notifies the node or a preceding element in the network, when this exchange starts, that a given virtual channel among the k virtual channels is free.

Memorization means $640_0, \ldots, 640_{k-1}$, for example in the form of buffer memories are also provided to store destination information of a packet during the transfer in node 500, particularly for flits following the packet header flit. This information is sent to memorization means 640 by the means 630. When the circuit or network is initialized, and before a header flit of a new packet accesses the input controller $600_0$, these memorization means $640_0, \ldots, 640_{k-1}$ send an initialization token to the means 630.

Preferably, the acceptance signal E_accept1, ..., E_acceptk−1 is only sent to acknowledge some types of packets, and particularly packets associated with virtual channels or priority channels with a priority level lower than the highest priority level.

Thus, an input controller decodes the synchronization signal, waits for a new data input value, assigns it to means $625_0, \ldots, 625_{k-1}$ corresponding to the priority level concerned, and depending on the destination of the current packet, validates one its outputs to the right output controller by means for a Valid_R_to_S signal.

FIG. 7 shows one architecture of a node output controller 500, for example output controller $700_0$.

This output controller $700_0$ orients a data flit of a packet to the output $550_0$ (not shown in FIG. 7) with which it is associated, in the form of an S_data signal, for example a 34-bit signal, to which a "send" type synchronization signal denoted S_send is attached.

The output controller can also make an output transfer arbitration $700_0$ between priority packets and lower priority packets. It can also make an arbitration between data packets with the same priority level.

In order to determine a transfer order between packets with different priorities, the output controller $700_0$ takes account of the virtual channels or priority channels with which these packets are associated.

To arbitrate a transfer order between packets with identical priorities, if these packets are associated with the highest level priority channel, the output controller $700_0$ can make an arbitration as a function of the inputs among the inputs $500_0, \ldots, 500_{n-1}$, from which each of these packets originates.

If the packets for which the transfer order is to be determined are associated with the same channel, for example channel 1, with a priority lower than the priority of the highest priority channel, for example channel 0, the controller can do a FIFO (first in first out) type arbitration.

Therefore the output controller $700_0$ can make an arbitration between transfer orders for several data packets accessing node 500 through one of the inputs $500_0, \ldots, 500_{n-1}$ and particularly between several packets that will access the output $550_0$ with which this controller $700_0$ is associated.

The output controller $700_0$ comprises classification means, for example k−1 memorization means or registers $710_1, \ldots, 710_{k-1}$ (where k is an integer number greater than or equal to 2, corresponding to the number of priority channels), in order to store "BoP" begin of packet requests or "BoP" parts of packets indicating a new packet, in the order in which these requests arrive, according to a first in first out classification.

Storage means $720_1, \ldots, 720_{k-1}$, each formed from n−1 buffer memories, each used to store n−1 begin of packet requests, are associated with k−1 classification means $710_1, \ldots, 710_{k-1}$ respectively. Each of the classification means $710_1, \ldots, 710_{k-1}$ comprises n inputs and is dedicated to the classification of packets associated with the same virtual channel. By default, the means $710_1, \ldots, 710_{k-1}$ can be put on standby or at rest and can be initialized or awakened as soon as an activity is detected on one of the priority channels.

This detection can be made using a probing function like that described in the document by P. Vivet, "Quasi-Delay Insensitive Integrated Circuit Design Methodology: Application to the Study and Design of a 16-Bit Asynchronous RISC Microprocessor", Thesis, Institut National Polytechnique in Grenoble, 2001.

Preferably, these means $710_1, \ldots, 710_{k-1}$ only classify packets associated with a priority channel lower than the highest priority channel, to enable the node 500 to quickly transfer packets associated with the highest priority channel, for example channel 0. When an activity is detected (BoP bit detected) on one of the channels:

if the BoP bit originates from input $510_0$, then the request from input $510_0$ is stored in a memory belonging to the means $720_1, \ldots, 720_{k-1}$, as a function of the priority channel of the packet to which this BoP belongs.

otherwise, if the BoP bit originates from the input $510_1$, then the request for input $510_1$ is stored in another memory belonging to means $720_1, \ldots, 720_{k-1}$, depending on the priority channel of the packet to which this BoP belongs.

Means 730 and means 740, for example in the form of state machines, are used to arbitrate the validity requests as a function of the current priority.

Several cases will be described to explain this arbitration method.

Firstly, the different signals shown in FIG. 7 will be described or made to correspond with the signals mentioned in FIG. 6.

The_R0_from_E0, . . . , valid_Rk−1_from_En−1 and bop_R1_from_E0, . . . , bopRk−1_from_En−1 signals are the valid_R_to_S and begin of packet bop_R_to_S signals respectively sent by means 630 in FIG. 6. The Rk_eop_fromE0 signals correspond to the valid_Rk_to_S1 and Rk_eop_to_S1 validity signals sent by the means 625 in FIG. 6. The Ak_to_E1 signals correspond to the Ak_from_S1 validity signals received by means 650 in FIG. 6. The Rk_fromE1 signals correspond to the Rk_to_S1 signals sent by means 625 in FIG. 6. The S_ACCEPT1, . . . , S_ACCEPTk−1 signals are acceptance signals received from an element (a node or a resource) in the network, that follows the asynchronous node 500 in the data path in the network.

Three cases can be distinguished concerning the arbitration method used by the state machine 730.

Case one: if the current processing priority is "empty state", and there is no longer any packet in progress towards this output controller, then:

if a packet associated with the highest priority channel, for example a packet associated with channel 0 is present, the current state becomes priority, the means 730 generate the NXT_PRIO signal and the source of the packet is kept using an NXT_FROM information. The validity signal is acknowledged.

If there is no higher priority channel packet present, a packet with a level or priority channel lower than the highest priority channel has awakened the method. The input to be transferred is read in one of the corresponding lists. The current state becomes non-priority, the NXT_PRIO signal is sent to the state machine 740, while the source of the packet is kept in the state machine 740 using the NXT_FROM information. The corresponding level acceptance signal is acknowledged.

Case two: the current priority is non-priority state (packet level k).

In this case, a non-priority packet can be interrupted by a higher priority packet.

A "guard" or selection means then test:

for the presence of a validity signal with a higher priority level, or the presence of a validity signal with a higher priority level, if an acceptance signal with the corresponding priority level originating from the next node in the network has been received, or the presence of the validity signal for the current non-priority packet, if an acceptance signal of the current non-priority level originating from the next node in the network, has been received.

If there is a higher priority packet present, the means 730 suspend the current non-priority packet by generating the TO_SUSPEND signal to the means 740, and the higher priority channel packet is processed.

If there is no packet associated with the highest priority channel, but the remainder of a packet associated with a channel with a lower priority than the higher priority channel is present, the remainder of the packet is processed.

Case three: the current priority is a higher priority state. In this case, the current packet cannot be interrupted and the remainder of the packet to be transferred is awaited.

An empty state initialization token is generated by the state machine 740.

Three cases can also be distinguished for the arbitration method used by the state machine 740:

Case one: the current state is empty state and there are no more packets in progress to this output. The EoP bit indicating the end of a packet concerned is decoded and the current state of the output is then updated. A control signal CTRL_SWITCH for the switching means 770 is activated.

For a non-priority packet, acceptance signals Ak_toEn with the corresponding level to the input stage are generated.

Case two: the current state is a non-priority state (packet level or channel between 1 and k).

If there is a new higher priority packet present, the current packet with the lower priority level is suspended. Therefore, the method will manage the suspension so as to authorize transfer of the new packet. In the case in which EoP=1, the packet length is 1 and there is no need for suspension.

Otherwise, the remainder of the current packet is transferred.

Case three: the current state is a higher priority state (packet level or channel 0).

The remainder of the packet with the higher priority level is then awaited.

Then, if the arbitration means 730 detect an activity on one of the validity signals with the highest priority level or on validity signals with a lower priority levels and if an acceptance signal with the corresponding priority level originating from the next node in the network has been received, the arbitration method firstly tests for the presence of the highest priority level packet with a fixed priority.

The means 740 manage priorities and the current state. Therefore these means receive EoP bits to make the decision to change from one state to the other and from one priority to the other. These means can also restore suspended lower priority level packets. They also generate a control signal CTRL_SWITCH for an output switch 770.

At the end of the packet, the method tests the output of suspension means 750 to determine whether or not a lower priority level packet has been suspended (CUR_SUSPENDED).

The means 750 can store state variables of the state machine 740, while the means 760 can be used to store suspension variables for this state machine 740. These means generate initialization tokens to the "empty state" and "no suspension".

The means 770 are switching means, for example a multiplexer with k(n−1) possible inputs (n−1 inputs with k priority levels) to the S_data output from the node. S_send is generated by these same means.

A circuit according to the invention can be modeled in the CHP language derived from CSP, that describes asynchronous nodes by communicating method. This can be done with reference to the article by A. J. Martin entitled "synthesis of asynchronous VLSI circuits", Caltech-CS-TR-93-28.

The circuit can then be synthesized partly using asynchronous circuit synthesis tools such as TAST (see the article by A. V. Dinh Duc et al. entitled "TAST CAD tools: tutorial", Intern. Symposium on Advanced research in Asynchronous Circuits and Systems ASYNC'02, Manchester, UK, Apr. 8-11, 2002; and also A. V. Dinh Duc et al. "synthesis of QDI asynchronous circuits from DTL-stylePetri net>>, IWLS-02, 11th IEEE/ACM Int. Workshop on Logic and Synthesis, New Orleans, La., Jun. 4-7, 2002), or using synthesis methods described in J B Rigaud et al. "Modeling and Design of Asynchronous Priority Arbitrers for On-Chip Communication Systems" in Com. Systems SOC Design Methodologies, edited by M. Roberts and al., Kluwer Academic Publishers, July 2002, ISBN 1-4020-7148-5 or J B Rigaud "libraries specification for the synthesis of asynchronous circuits", thesis, INPG, 2002, particularly for arbitration blocks.

An asynchronous network structure according to the invention can be used to implement different types of services, for example such as a "guaranteed latency" service and another service commonly called a "best effort" service. The implementation of these different services and management of priorities between data packets transiting in such a structure is at least partly assured using priority channels called "virtual channels" with which the data packets are associated.

The invention claimed is:

1. Data transmission method in a network on chip with an asynchronous communication protocol, said network comprising one or several nodes and one or several resources, each node being provided with one or several inputs associated with one or several input controllers, and one or several outputs associated with one or several output controllers, the method comprising:

receiving at a receiving node priority channel information associated with each of a plurality of data packets which are to be routed to the same output of the receiving node, each priority channel information and associated data packet both being sent from another node of the one or several nodes or from a resource of the one or several resources, each priority channel information being at least partially contained in a first type of synchronization signal transmitted according to the asynchronous communication protocol; and determining at said receiving node a transfer hierarchy among said plurality of data packets to be routed to said one output, said hierarchy being determined at least as a function of the priority channel information associated with each data packet, and wherein said receiving node operates without an internal clock.

2. Method according to claim 1 comprising, when priority channel information for the data packets is identical, determining the transfer hierarchy by assigning a priority level to each data packet, depending on each data packet's time of arrival in the receiving node or an input port of arrival into the receiving node.

3. Method according to claim 1, wherein when an outgoing packet is being output from the receiving node but has a lower priority level than an incoming packet, output of the outgoing packet is interrupted or stopped and the incoming packet is output in priority thereto.

4. Method according to claim 1, wherein routing information is associated with each data packet, different portions of the routing information being addressed to respective different nodes along a route of the data packet.

5. Method according to claim 4, wherein routing information addressed to a receiving node is read and used in that receiving node, and other routing information addressed to nodes not yet passed through is prepared for a next destination of the data packet in the network.

6. Method according to claim 4, wherein routing information is located at the beginning of the data packet.

7. Method according to claim 4, comprising when routing information addressed to a receiving node is read and used in that receiving node, memorizing said routing information in an input controller of that receiving node so that data can be transferred from the input controller of that receiving node to an output controller of that receiving node.

8. Method according to claim 4, comprising said receiving node memorizing routing information for the outgoing packet for which the output is interrupted or stopped.

9. Method according to claim 1, further comprising:

receiving and accepting the first type of synchronization signal and receiving and accepting one or several items of data from the one or several nodes or resources; and sending to the node or resource that transmitted the priority channel information to the receiving node a second type of synchronization signal or acceptance signal.

10. Method according to claim 9, wherein the receiving node does not send the second type of synchronization signal or acceptance signal for data with which the highest priority channel is associated.

11. Method according to claim 9, wherein synchronization signals of the asynchronous communication protocol are implemented using a four-phase protocol, or multi-rail encoding.

12. Method according to claim 1, further comprising receiving a beginning of a data packet to be transmitted at an input controller of the receiving node and in response thereto sending a validity signal to an output controller of the receiving node associated with an output to which the data must be transmitted, the validity signal containing data related to a priority channel of said data packet to be transmitted.

13. Method according to claim 12, further comprising, after receiving the validity signal at the output controller of the receiving node, queuing a beginning of packet request into a queue structure comprising respective queues for data packets having the same priority channel information, excluding data packets for which the priority channel information corresponds to a highest priority.

14. Method according to claim 12, further comprising, after receiving the validity signal at the output controller of the receiving node, monitoring registers of the input controller of the receiving node in which data are stored, said monitoring being performed as a function of priority channel information presently associated with respective ones of said registers.

15. Method according to claim 1, further comprising memorizing said priority channel information at the input controller of the receiving node in order to transfer data to the output controller of the receiving node.

16. A network on chip with an asynchronous communication protocol, the network comprising one or several nodes and one or several resources, each node being provided with one or several inputs associated with one or several input controllers, and one or several outputs associated with one or several output controllers, at least one of the nodes operating without an internal clock, each input controller of the at least one node operating without the internal clock comprising:
  means for determining a transfer hierarchy between at least two data packets to be routed to the same output, the transfer hierarchy being determined at least as a function of priority channel information associated with each of the at least two data packets; and
  means for receiving a synchronization signal comprising the priority channel information for the at least two data packets from another node or network resource, the priority channel information and the data packet both being sent from the same node or resource.

17. Device according to claim 16, the means for determining the transfer hierarchy comprising means for assigning a priority level to each data packet when priority channels are identical, depending on its time of arrival in the node or the input or the input port into the node.

18. Device according to claim 16, also comprising means to interrupt or suspend the output from a first packet when this first packet is being output from the node, but has a lower priority level than the priority level than a second packet called the incoming packet, so as to output the second packet in priority.

19. Device according to claim 16, also comprising means for decoding routing information associated with each data packet, some of this routing information being addressed to each node passed through.

20. Device according to claim 19, comprising means for reading the routing information related to a node, and means for preparing routing information for the next destination of the data packet in the network.

21. Device according to claim 19, also comprising means for memorizing routing information in the input controller of a node passed through, in order to transfer data from the input controller to the output controller.

22. Device according to claim 19, the asynchronous node having means for memorizing routing information for the first packet for which the output is interrupted or stopped.

23. Device according to claim 16, the asynchronous node also comprising means for sending an acceptance signal to the element from which it received one or more data items when said asynchronous node receives these data, the acceptance signal being sent after reception of data and acceptance, of both data and the corresponding synchronization signal.

24. Device according to claim 16, the input controller comprising means for sending a so-called validity signal to the output controller of the output to which the data are to be transmitted when it receives a begin of packet for data to be transmitted, this validity signal containing data related to the priority channel of said data to be transmitted.

25. Device according to claim 24, the output controller comprising means for incorporating a begin of packet request for a packet that does not form part of the data packets with the highest priority channel, in a queue of begin of packet requests belonging to data packets with the same priority channel, after receiving a validity signal.

26. Device according to claim 24, the output controller comprising means for monitoring registers of the input controller in which data are stored as a function of their priority channel, after reception of a validity signal.

27. Device according to claim 16, the input controller comprising means for memorizing priority channel data so as to transfer data towards the output controller.

28. Method according to claim 10, wherein synchronization signals of the asynchronous communication protocol are implemented using a four-phase protocol.

* * * * *